United States Patent [19]

Zender

[11] Patent Number: 5,391,428

[45] Date of Patent: Feb. 21, 1995

[54] MONOLITHIC CERAMIC/FIBER REINFORCED CERAMIC COMPOSITE

[75] Inventor: Mark D. Zender, Minneapolis, Minn.

[73] Assignee: Minnesota Mining and Manufacturing Company, St. Paul, Minn.

[21] Appl. No.: 197,351

[22] Filed: Feb. 16, 1994

Related U.S. Application Data

[63] Continuation of Ser. No. 897,879, Jun. 12, 1992, abandoned.

[51] Int. Cl.$^6$ ............................................. B32B 5/22
[52] U.S. Cl. ................................ 428/297; 428/34.4; 428/34.5; 428/301; 428/302; 428/367; 428/368; 428/375; 428/408; 428/698; 428/384; 501/95
[58] Field of Search ................. 428/297, 34.4, 34.5, 428/301, 302, 367, 368, 375, 408, 698, 34.1, 34.6, 384, 427, 428; 501/95; 264/30, 60, 241

[56] References Cited

U.S. PATENT DOCUMENTS

| | | | |
|---|---|---|---|
| 4,092,194 | 5/1978 | Green | 156/89 |
| 4,275,095 | 6/1981 | Warren | 427/228 |
| 4,397,901 | 8/1983 | Warren | 428/101 |
| 4,526,824 | 7/1985 | Dworak et al. | 428/35 |
| 4,766,013 | 8/1988 | Warren | 427/228 |
| 4,863,798 | 9/1989 | Arenz et al. | 428/368 |
| 5,051,300 | 9/1991 | Rousseau | 428/245 |
| 5,110,771 | 5/1992 | Carpenter et al. | 501/95 |
| 5,178,921 | 1/1993 | Whelan | 428/34.5 |
| 5,196,120 | 3/1993 | White | 210/504 |
| 5,211,999 | 5/1993 | Okada | 428/34.5 |
| 5,254,374 | 10/1993 | Devlin et al. | 427/553 |
| 5,260,125 | 11/1993 | Copes | 428/285 |
| 5,283,089 | 1/1994 | Bates | 428/344 |
| 5,304,031 | 4/1994 | Bose | 415/173.4 |
| 5,306,565 | 4/1994 | Corbin et al. | 428/432 |

FOREIGN PATENT DOCUMENTS

| | | | |
|---|---|---|---|
| 0517449A2 | 12/1992 | European Pat. Off. | C04B 35/56 |
| 0528411A1 | 2/1993 | European Pat. Off. | C04B 41/89 |
| 2929217C2 | 11/1987 | Germany | B32B 18/00 |

OTHER PUBLICATIONS

"Nextel TM 312 Braided Sleeving" Product Bulletin, 3M Ceramic Materials Department, 3M Company, St. Paul, Minn.

"Siconex TM Fiber-Reinforced Ceramic Data Sheet," New Products Department, 3M Industrial and Electronic Sector, 3M Company, St. Paul, Minn.

*Primary Examiner*—Patrick J. Ryan
*Assistant Examiner*—Marie R. Macholl
*Attorney, Agent, or Firm*—Gary L. Griswold; Walter N. Kirn; Gregory D. Allen

[57] ABSTRACT

A shaped ceramic-ceramic composite article comprising a ceramic monolith, preferably in the shape of a hollow tube, having a ceramic fiber matrix thereover, coated with carbonaceous material and overcoated with silicon carbide.

19 Claims, No Drawings

MONOLITHIC CERAMIC/FIBER REINFORCED CERAMIC COMPOSITE

This is a continuation of application Ser. No. 07/897,879, filed Jun. 12, 1992, now abandoned.

FIELD OF THE INVENTION

This invention relates to a shaped ceramic-ceramic composite article comprising a ceramic monolith, ceramic fibers or carbon fibers, a first coating of a carbonaceous matrix, and a second coating of silicon carbide.

BACKGROUND OF THE INVENTION

Ceramic-ceramic composites are particularly useful in high temperature, chemically corrosive environments. This is because such composites are able to withstand chemical corrosion better than comparable metal parts, and because they are better able to withstand thermal and mechanical shock than monolithic ceramic parts.

Ceramic-ceramic composites are described in U.S. Pat. Nos. 4,275,095 and 4,397,901, which describe the method of making a composite article with a carbon fibrous substrate, a pyrolytic carbon sheath, and a compliant coating of metallic carbide, oxide, or nitride over the coated fibers. The fibers are taught to be cellulose, pitch, rayon, polyacrylonitrile, or wool.

U.S. Pat. No. 4,766,013 describes a fibrous substrate with a pyrolytic carbon coating deposited around each fiber, and a metal carbide, boride, oxide, or nitride coating over each fiber. The fibers are taught to be carbonaceous or ceramic.

U.S. Pat. No. 4,863,798 discloses multiple layers of coatings on a carbon or ceramic base. A substrate of chopped fibers, felt, cloth or granular material (graphite or silicon carbide) is mixed with a carbonaceous binder and coated with a pyrolytic carbon layer. A barrier layer of boron nitride or boron carbide is then applied and silicon carbide is coated over that.

A commercially available ceramic composite is marketed under the trade designation "SICONEX" by the Minnesota Mining and Manufacturing Co. (3M) of St. Paul, Minn. SICONE TM composites are ceramic-ceramic composites comprised of aluminoborosilicate ceramic fibers, a carbonaceous layer, and a silicon carbide overlayer. SICONEX TM composites are prepared by braiding, weaving, or filament winding aluminoborosilicate ceramic fibers in a desired shape, or alternatively, fashioning aluminoborosilicate ceramic cloth into such a shape. The ceramic fiber shape is then treated with a phenolic resin which is cured, producing a rigidified article. The thus rigidified article is heated in an evacuated chamber such that the cured phenolic resin is carbonized. The article is then coated with silicon carbide via chemical vapor deposition at temperatures ranging from about 900° to about 1200° C. to provide a semi-permeable, chemically resistant coating of silicon carbide. The resultant rigid ceramic composite is useful at high temperatures in corrosive environments and has excellent thermal shock resistance. Such materials, appropriately shaped, are commonly used as radiant burner tubes or burner inserts.

One disadvantage to such constructions is that they are permeable to gases. It has been difficult to produce by any of the aforementioned techniques a shaped composite article which is impermeable to gases through the article wall. For some applications, it would be very desirable to have an entirely impermeable construction.

For example, a "thermowell" is a term used in this art for a holder of a thermocouple in a high temperature furnace. Frequently, the furnace atmosphere is chemically corrosive, and thus it becomes important that the thermocouple holder be resistant to chemical degradation.

Conventional ceramic-ceramic composites have been used as thermocouple shields or thermowells, but generally are porous to the atmosphere in the furnace. This can lead to a rapid, undesirable degradation of the thermocouple. It is also difficult to shape long, narrow diameter tubes of ceramic fabric or fiber into long, straight, uniform diameter tubes and to maintain the straightness and uniformity after undergoing the silicon carbide coating process.

SUMMARY OF THE DISCLOSURE

A shaped ceramic-ceramic composite article comprising a ceramic monolith, preferably in the shape of a hollow tube, having a ceramic fiber matrix or carbon fiber maxtrix thereover, coated with carbonaceous material and overcoated with silicon carbide.

The shaped article displays excellent chemical corrosion resistance as well as resistance to thermal and mechanical shock.

DETAILED DESCRIPTION

The present invention provides a composite which is impermeable to gases while also providing a solution to the difficulties of processing long, narrow diameter tubes in the chemical vapor deposition process.

A ceramic monolithic article, such as a tube, is wrapped with ceramic fiber or carbon fiber or fitted with a ceramic or carbon fabric sheath, coated with a carbonaceous layer, and overcoated with silicon carbide. This construction in tubular form is particularly useful as a shield for thermocouples in high temperature furnaces.

The ceramic monolith can be, for example, mullite, alumina, steatite, cordierite, silicon carbide, zirconia, or quartz and is most frequently useful in the shape of a tube.

Ceramic fibers useful in the composite article include oxide ceramic such as alumina fibers, aluminosilicate fibers, and aluminoborosilicate fibers or mixtures of same. Other ceramic fibers, such as silicon carbide fibers, are also suitable herein.

Methods for making alumina fibers are known in the art and include, for example, that disclosed in U.S. Pat. No. 4,954,462 (Wood et al). Suitable aluminosilicate fibers are described in U.S. Pat. No. 4,047,965 (Karst et al). These aluminosilicate fibers are comprised of 67 to 77 parts by weight alumina and 23 to 33 parts by weight silica. Suitable aluminoborosilicate fibers are described in U.S. Pat. No. 3,795,524. These aluminoborosilicate fibers have an alumina:boria mole ratio of 9:2 to 3:1.5 and contain up to 65 weight percent silica.

The ceramic fiber used in the examples is an aluminosilicate fiber, having the trade designation NEXTEL TM 550 ceramic fiber, available from 3M Co., St. Paul, Minn. NEXTEL TM 312, 440, and 480 form a family of ceramic fibers having varying percentages of aluminoborosilicate. NEXTEL TM 550 ceramic fiber is an aluminosilicate fiber. NEXTEL TM 610 ceramic fiber is an alumina fiber. Such fibers all can be formed into fabrics or shapes suitable for practicing this invention.

Silicon carbide fibers, available under the trade designation "NICALON" (manufactured by Nippon Carbon and available from Dow Corning, Midland, Mich.), or "TYRANNO" fibers, (manufactured by UBE Industries and available from Textron Specialty Materials in Lowell, Mass.) are similarly suitable for the practice of this invention. In addition, carbon fibers such as the polyacrylonitrile-based fibers available from Hercules Corp., Wilmington, Del., are suitable for use herein.

Typically, individual ceramic fibers may be grouped together to form a yarn. Generally, the ceramic yarn has a diameter in the range from about 0.2 mm to about 1.5 mm. Yarn diameters in these ranges typically display superior textile qualities compared to yarns with diameters outside these ranges. Such yarns also typically comprise from about 780 to about 7800 individual ceramic oxide fibers.

Preferably, the ceramic yarn is ply-twisted because such a construction exhibits better strength.

The ceramic yarn can be formed into a desired shape using conventional techniques known in the art including, for example, braiding, knitting, or weaving the yarn into the desired shape (e.g., a hollow tube); braiding or weaving the yarn into a cloth or fabric and forming the cloth into a desired shape (e.g., a hollow tube or a flat sheet); or winding the yarn around a workpiece (e.g., helically winding or cross-winding the yarn around a workpiece).

It is believed that a carbonaceous layer between the outer silicon carbide coating and the ceramic or carbon fibers assists in preventing extremely good bonding between the ceramic fiber preform and the silicon carbide overcoat. Such is important because the fusion of such layers would result in a material exhibiting non-composite behavior, i.e., it would tend to be brittle and potentially exhibit catastrophic failure. Such a carbonaceous layer can be applied in two ways.

In the first, carbon can be decomposed onto the surface of the ceramic or carbon fiber in the chemical vapor deposition (CVD) process by decomposition from a hydrocarbon such as propane or methane at elevated temperatures.

In the second, a phenolic resin in solution is applied to the surface of the fiber, and allowed to dry and cure. The phenolic decomposes to a carbonaceous layer at the high temperatures required for chemical vapor deposition of the silicon carbide overlayer. The phenolic resin is further useful in that it aids in forming and shaping the ceramic or carbon fiber or fabric to the underlying monolithic tube. Phenolic resin can be applied to the individual fiber tows during the filament winding process or before they are woven into cloth. Alternatively, the resin can be sprayed, brushed, or poured onto the workpiece or the workpiece can be dipped into the resin after weaving, braiding, or filament winding.

The organic resin can be any suitable organic-based resin which is compatible with the method described herein for making the article of the invention and which is capable of being carbonized. Preferably, the organic resin which is coated onto the ceramic or carbon fiber(s) is a phenolic resin, wherein "phenolic resin" is a term that describes a wide variety of resin products which result from the reaction product of phenols with aldehydes. Phenolic resins include, for example, acid catalyzed phenolic resins and base catalyzed phenolic resins. Phenolic resins are commercially available, for example, under the trade designations "DURITE-SC-1008" from Borden Chemical of Columbus, Ohio, and "BKUA-2370-UCAR" (a water-based phenolic resin solution) from Union Carbide of Danbury, Conn.

In one embodiment of the invention, a braided ceramic fiber sheath can be fitted over an alumina or a mullite tube, smoothed out, and phenolic resin dissolved in methanol brushed or poured onto the ceramic fiber until completely wet. The end of the tube can be wrapped with NEXTEL TM sewing thread in order to seal the tube and prevent silicon carbide deposition on the inside. The resin-coated preform can then be dried in air and cured in an oven to rigidize the part.

The article comprising the monolithic ceramic tube, the ceramic fibers, and the carbonized layer can then be overcoated with silicon carbide by chemical vapor deposition. Suitable commercially available silicon carbide precursors include, for example, dimethyldichlorosilane (DDS) and methyltrichlorosilane (MTS).

Typically, the workpiece is placed in an evacuated CVD apparatus, comprising a quartz vacuum envelope, a graphite reactor, and an induction-heated coil. While flowing a non-oxidizing gas through the evacuated chamber, the furnace is heated to the desired carbonization temperature. Silicon carbide is coated over the carbonized layer by introducing dimethyldichlorosilane (DDS) or methyltrichlorosilane (MTS) into the chamber. Typically, the silicon carbide precursor is introduced into the chamber by bubbling a non-oxidizing gas through a suitable liquid silicon carbide precursor (the highly volatile DDS or MTS) or by independently introducing a gaseous silicon carbide precursor into the chamber through a separate gas line. Typically the chamber is evacuated to a pressure in the range from about 5 to about 50 torr. The preferred flow rates of the silicon carbide precursor and non-oxidizing gas are dependent on the size of the furnace chamber.

The time typically required to provide a composite article wherein the amount of silicon carbide deposited is from about 50 to about 75 percent by weight of the ceramic or carbon fiber ranges from about 4 to about 30 hours, depending on the deposition temperature and pressure, the flow rates of the gases, and the surface area of the article. Typically, it is desirable to deposit about 50 percent by weight silicon carbide per weight of the fiber. The particular furnace used in the experiments herein was about 183 cm (72 inches) in length with a diameter of about 33 cm (13 inches), and the pressure in the furnace was about 20 torr. The temperature was ramped up to 1050° C., while flowing MTS and hydrogen gas in at 6 standard liters/minute. In this coating process, it is desirable that the deposition of silicon carbide commence slowly at first. As the silicon carbide deposition proceeds, the cured phenolic resin layer on the workpiece decomposes to form the carbonaceous layer. The gas pressures were then increased to 20 torr, and the MTS flow rate was increased to 8 standard liters per minute to deposit greater amounts of silicon carbide. After about 7.5 hours of coating, the silicon carbide:substrate weight ratio was about 1.0:2.3 (i.e., about 30 weight percent SiC to about 70 weight percent substrate). In this chamber as many as eight tubes could be coated at one time.

Alternatively, if a carbonaceous layer is to be applied by the thermal decomposition of hydrocarbons, the procedure above would be adjusted such that propane or methane, and optionally nitrogen, would flow through the furnace chamber while the temperature was ramped up to about 1000° C. (about 16° C./minute ramping from room temperature to 1000° C. in 1 hour). At a gas pressure of about 10 torr and a flow rate of about 5 standard liters per minute, pyrolytic carbon would be deposited for about 1 hour. The silicon-containing gases would then be admitted as described above to commence coating with silicon carbide.

For silicon carbide deposition, the article is heated according to the following schedule:
room temperature →1025° C. @ 8° C./minute
1025° C.→1100° C. @0.6° C./minute
1100° C. for remainder of run time The preferred gas flow rate of the nonoxidizing gas is dependent on the size of the furnace chamber. For a 33 cm diameter, 183 cm length chamber, the preferred pressure was up to 10 torr at 1025° C., and then the pressure was increased to about 20 torr at the higher temperature of 1100° C. Those skilled in the art will recognize that slight modifications in run conditions are made as necessary during a run, which will take several hours.

After coating, the furnace is backfilled with an inert gas such as nitrogen and allowed to cool to room temperature before removing and examining the coated parts.

Typically, the total coating weight was about 15 percent silicon carbide to about 50 percent silicon carbide (i.e., 15 to 50 percent by weight of the final coated article was due to silicon carbide).

Upon thermal shock (i.e., heat treatment followed by rapid quenching), the inventive article exhibits "composite" fracture properties, rather than "monolithic" fracture properties. The monolithic tube exhibits brittle fracture, as expected, and the overlying ceramic fiber, ceramic matrix layer exhibit a "brushy" fracture surface, characteristic of a composite fracture. A "brushy" fracture surface is characteristic of a composite having fibers which have not fused together or fused to the matrix material. The overlying fiber-silicon carbide layer adds additional strength to the underlying monolith as evidenced by increased temperatures needed to cause thermal shock and by increased mass required to cause breakage.

EXAMPLE 1

This example describes the preparation of a mullite tube wrapped with the fiber reinforced—silicon carbide matrix.

A mullite tube (0.95 cm outer diameter, 0.635 cm inner diameter, 61 cm long) obtained from Ipsen Ceramics, Pecatonica, Ill., was fitted with a 61 cm length of NEXTEL TM 312 braid, 1.27 cm (0.5 inch) diameter. A length of NEXTEL TM 312 thread was wrapped around each end of the tube to close it off and prevent deposition of SiC on the inside of the tube during the coating run. The braiding was coated with a water-based phenolic resin solution which had been diluted with methanol in a 5:1 ratio (BKUA-2370-UCAR, available from Union Carbide, Danbury, Conn.). The phenolic resin was slowly poured over the braid to achieve complete coverage with the phenolic. The coated tube was allowed to dry in air for about 30 minutes and then was placed into an oven at about 200° C. for 12 minutes to cure the phenolic resin. The tube exhibited a golden color from the resin at this point. Then the tube was suspended in the CVD furnace (33 cm (13 inch) diameter × 138 cm (54 inch) length) and coated with SiC according to the following run conditions:

| Time | Temperature, °C. | Pressure (torr) | Flows (MTS/H2/N2) |
| --- | --- | --- | --- |
| 2 hrs | 1025 | up to 10 | 8/16/8 |
| 2 hrs | 1100 | up to 10 | 8/16/8 |
| 3.5 hrs | 1100 | 20 | 8/16/8 |

Thus, decomposition of methyltrichlorosilane (MTS) was carried out for a total of 7.5 hours at a temperature of 1100° C. The total amount of silicon carbide was 30 percent by weight of the substrate (tube plus fiber braid). The coated tube was removed from the CVD chamber and examined.

The silicon carbide coating was black in color and appeared to have infiltrated the fibers.

Small segments (about 5 cm long) of the coated tube were sawed off by means of a diamond edged saw and tested in a 3-point bend test (similar to ASTM standard C-947, for glass fiber reinforced concrete). An uncoated, untreated mullite tube sustained a load of 200 pounds (90.9 kg) before fracturing. A monolithic ceramic/fiber reinforced ceramic composite tube sustained 399 pounds (181.4 kg) before fracturing.

This indicates that the fiber reinforced silicon carbide matrix adds strength to the underlying mullite tube.

Sections of the mullite tubing were heated in a small lab furnace from 600° to 900° C. and tested at 100 degree intervals for thermal shock resistance by quickly removing a piece from the furnace and plunging it into about 1 liter of room temperature water. The mullite tubing broke from thermal shock after heating to 900° C.

Sections of the composite article were sawed from a longer piece into about 5 cm segments, and then heated to from 600° to 1100° C. and plunged into water as described above. The test was carried out at 100 degree intervals. There was no fracture until the part was heated to 1100° C. This indicates improved fracture resistance in the inventive article over that of the monolithic tube.

EXAMPLE 2

This example describes a narrow diameter mullite tube sheath wrapped with the fiber reinforced—silicon carbide matrix.

A thermocouple sheath (0.32 cm (1/8") diameter × 183 cm (6 feet) long mullite tube, having 6 narrow-bore holes the length of the tube, obtained from MRL Industries, Sonora, Calif.) was fitted with an approximately 190 cm long section of NEXTEL TM 550 braided sleeving (0.32 cm (1/8") diameter. The braid was slightly longer than the sheath so that the ends could be trimmed after coating. The braiding was coated with a water-based phenolic resin solution which had been diluted with methanol in a 5:1 ratio (BKUA-2370-UCAR). The phenolic resin was slowly poured over the braid to achieve complete coverage with the phenolic. The coated tube was allowed to dry in air for about 30 minutes. Then the tube was suspended in a CVD furnace (about 30 cm (12 inches) × 305 cm (10 feet)) and coated with SiC according to the following heating schedule:

| Time | Temperature, °C. | Pressure (torr) | Flows (MTS/H2/N2) |
| --- | --- | --- | --- |
| 2 hrs | 1025 | up to 10 | 8/16/8 |

-continued

| Time | Temperature, °C. | Pressure (torr) | Flows (MTS/H2/N2) |
|---|---|---|---|
| 2 hrs | 1100 | up to 10 | 8/16/8 |
| 20 hrs | 1100 | 20 | 8/16/8 |

Thus, decomposition of MTS was carried out for a total of 24 hours at a temperature of 1100° C. The coated tube was removed from the CVD chamber and examined. The silicon carbide was black in color and appeared to have infiltrated the fibers.

What is claimed is:

1. A shaped ceramic-ceramic composite article comprising a shaped ceramic monolith, a ceramic fiber matrix thereover, a carbonaceous coating on said matrix, and overlying said coating a coating of silicon carbide, said shaped ceramic monolith being selected from the group consisting of a shaped alumina ceramic monolith, a shaped mullite ceramic monolith, a shaped silicon carbide ceramic monolith, and a shaped zirconia ceramic monolith.

2. The article of claim 1 wherein said ceramic monolith is in the shape of a hollow tube.

3. The article of claim 1 wherein said ceramic fiber matrix comprises ceramic fibers selected from aluminoborosilicate fibers, aluminosilicate fibers, alumina fibers, mixtures thereof, and silicon carbide fibers.

4. The article of claim 1 wherein said ceramic fiber matrix is grouped to form a yarn.

5. The article of claim 1 wherein said ceramic fiber matrix comprises braided, knitted or woven yarn.

6. The article of claim 1 wherein said carbonaceous coating is derived from a phenolic resin.

7. The article of claim 4 wherein said yarn has a diameter from about 0.2 to about 1.5 mm.

8. The article of claim 4 wherein said yarn is ply-twisted.

9. The article of claim 1 wherein said coating of silicon carbide is present in an amount equal to from about 50 to about 75 percent by weight of said ceramic fiber matrix.

10. The article of claim 1 wherein said article comprises from about 15 to about 50 percent by weight of said coating of silicon carbide.

11. The article of claim 1 wherein said shaped ceramic monolith is a shaped alumina ceramic monolith.

12. The article of claim 11 wherein said ceramic fiber matrix comprises ceramic fibers selected from aluminoborosilicate fibers, aluminosilicate fibers, alumina fibers, and mixtures thereof.

13. The article of claim 1 wherein said shaped ceramic monolith is a shaped mullite ceramic monolith.

14. The article of claim 13 wherein said ceramic fiber matrix comprises ceramic fibers selected from aluminoborosilicate fibers, aluminosilicate fibers, alumina fibers, and mixtures thereof.

15. A shaped ceramic-ceramic composite article comprising a shaped ceramic monolith, one of a ceramic fiber matrix or a carbon fiber matrix thereover, a carbonaceous coating on said matrix, and overlying said coating a coating of silicon carbide, said shaped ceramic monolith being selected from the group consisting of a shaped alumina ceramic monolith, a shaped mullite ceramic monolith, a shaped silicon carbide ceramic monolith, and a shaped zirconia ceramic monolith.

16. The article of claim 15 wherein said ceramic monolith is in the shape of a hollow tube.

17. The article of claim 15 wherein said carbonaceous coating is derived from a phenolic resin.

18. The article of claim 15 wherein said coating of silicon carbide is present in an amount equal to from about 50 to about 75 percent by weight of said ceramic fiber matrix or said carbon fiber matrix.

19. The article of claim 15 wherein said article comprises from about 15 to about 50 percent by weight of said coating of silicon carbide.

* * * * *

UNITED STATES PATENT AND TRADEMARK OFFICE
CERTIFICATE OF CORRECTION

PATENT NO.: 5,391,428

DATED: February 21, 1995

INVENTOR(S): Zender

It is certified that error appears in the above-identified patent and that said Letters Patent is hereby corrected as shown below:

Col. 1, line 45, "SICONE TM" should be --SICONEX$^{TM}$--.

Signed and Sealed this

Twenty-ninth Day of August, 1995

BRUCE LEHMAN

Attest:

Attesting Officer     Commissioner of Patents and Trademarks